United States Patent [19]

Welch

[11] 4,317,578
[45] Mar. 2, 1982

[54] KEYLESS CHUCKING SYSTEM
[76] Inventor: Thomas R. Welch, 2730 N. Creston Dr., Hollywood, Calif. 90068
[21] Appl. No.: 91,979
[22] Filed: Nov. 7, 1979
[51] Int. Cl.³ .............................................. B23B 31/06
[52] U.S. Cl. ...................................... 279/60; 279/62; 318/345 C
[58] Field of Search ............................ 279/1 K, 60–62, 279/56; 318/345 C, 345 D
[56] References Cited
U.S. PATENT DOCUMENTS 2,119,986  6/1938  Dremel .......................... 279/1 K X
2,211,216  8/1940  Oster ............................. 279/1 K X
2,716,555  8/1955  Rowe ............................. 279/56 X
3,460,017  8/1969  Eggleston et al. ................ 318/345

*Primary Examiner*—Robert D. Baldwin
*Attorney, Agent, or Firm*—Allan M. Shapiro

[57] ABSTRACT

The chucking system is used with a machine tool having a spindle which drives a chuck. The chuck-tightening sleeve can be locked to the machine tool frame so that rotation of the spindle causes tightening or loosening of the chuck, depending upon direction of spindle rotation. In this way, key-locking of the chuck is avoided.

33 Claims, 20 Drawing Figures

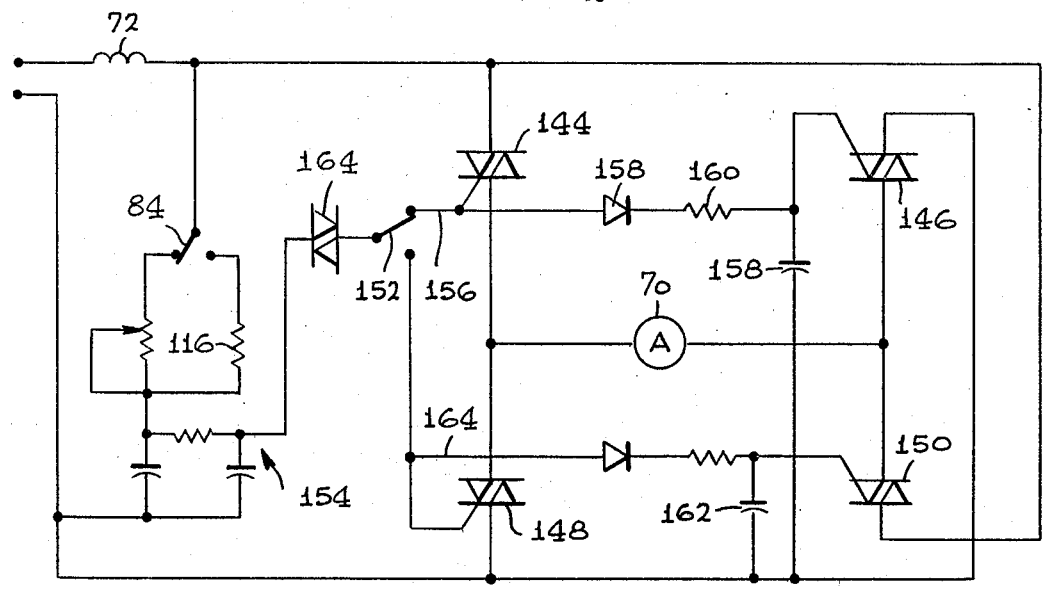
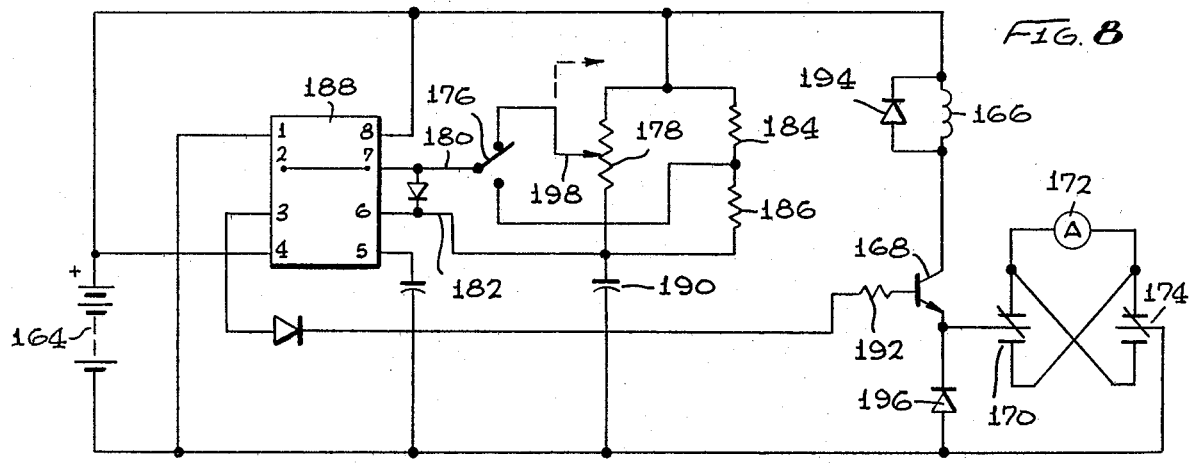
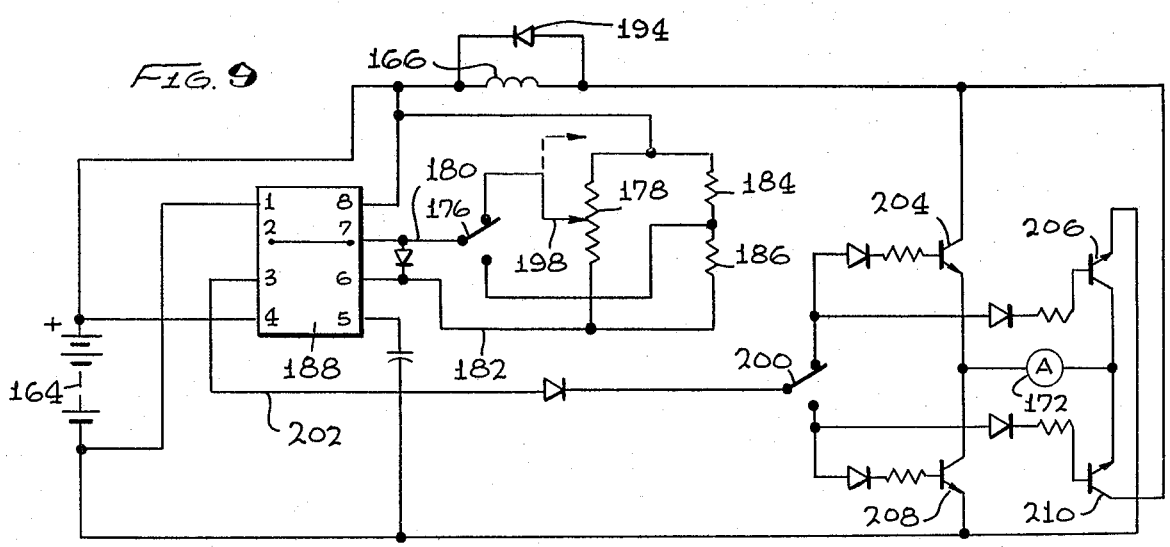

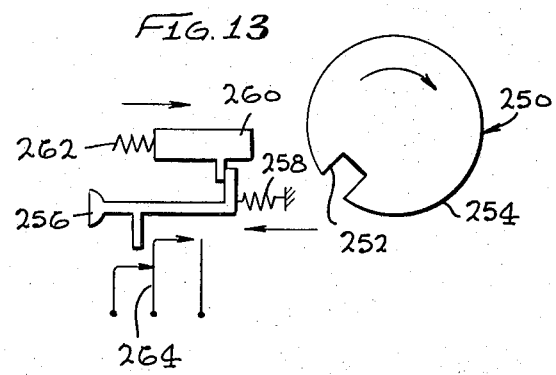
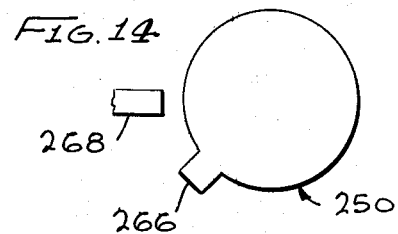
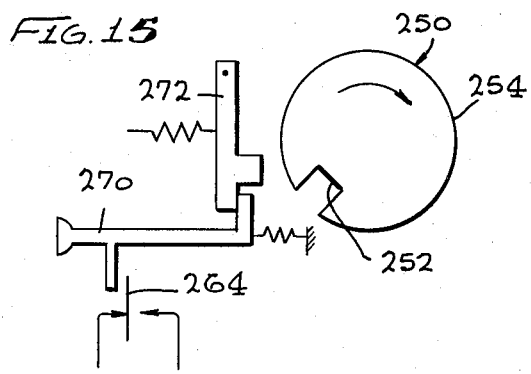
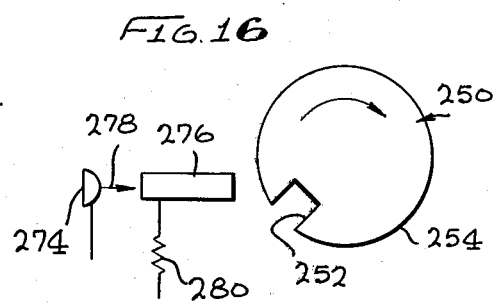
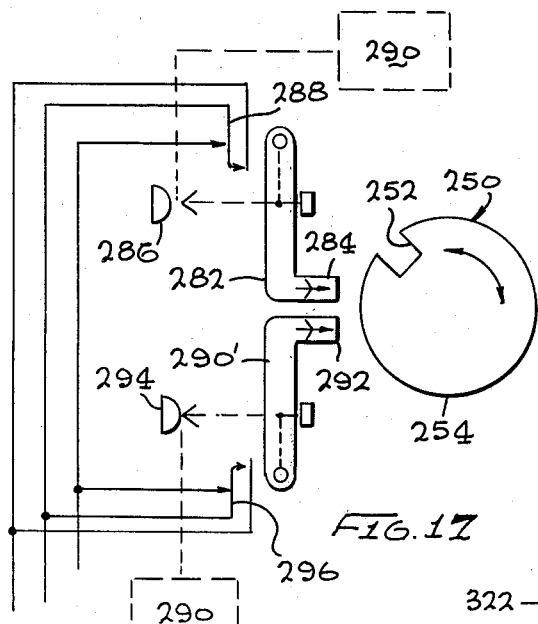
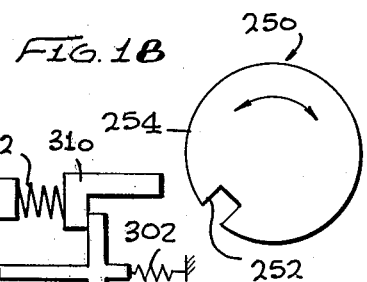
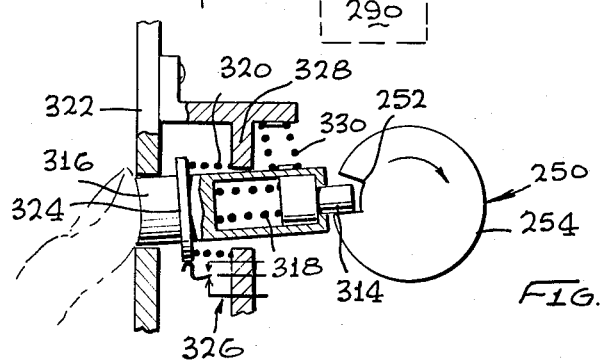
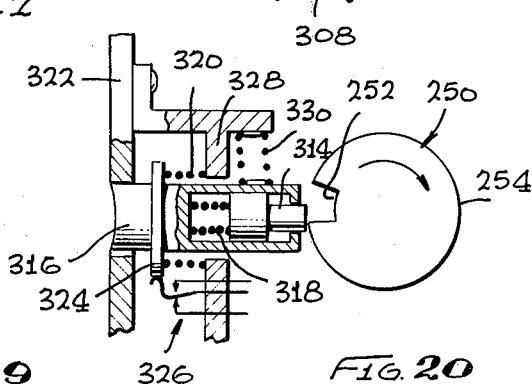

KEYLESS CHUCKING SYSTEM

BACKGROUND OF THE INVENTION

This invention is directed to a chucking system wherein a keyless chuck is tightened or loosened by spindle rotation.

The most common type of chuck on such machine tools as drills, presses or other drill drivers, uses a key for tightening the chuck and clamping the drill in place. This type of key-tightened chuck has several disadvantages such as being unsafe and seldom having the key where it is needed.

To leave the key in the chuck is a common error, and when the drill driver is turned on, the chuck key can fly off at dangerous velocity.

Losing the key is a very common problem, and when this occurs, a most unsatisfactory substitute is to try to tighten the chuck with pliers or a wrench.

One solution to the lost key problem is to attach the key to the electric cord of a tool, but it is often just out of reach when it is most needed, such as when the user is on a ladder and the key is at the far end of the cord.

A further factor is the time lost in handling the key, even when it is conveniently available. Picking up the key, inserting it and turning it is a time-consuming manual activity, even when the key is conveniently placed. Using a key occasions unnecessary time loss.

SUMMARY OF THE INVENTION

In order to aid in the understanding of this invention, it can be stated in essentially summary form that it is directed to a chucking system with a chuck for attachment onto the spindle of a machine tool with means to lock the chuck sleeve to the machine tool frame for opening and closing the chuck through the rotation of the machine tool drive motor.

It is, thus, an object of this invention to provide a keyless chucking system which eliminates the chuck key problems such as key loss, inconvenient key location, and time loss due to key handling. It is another object to provide a keyless chucking system wherein the chuck is tightened and loosened through the action of the machine tool spindle on which it is mounted, with the chuck sleeve being temporarily lockable to the machine tool frame. It is a further object of this invention to provide a machine tool motor control which controls the motor driving the machine tool spindle during the chuck locking and unlocking actions to control the machine tool drive motor in the desired speed and direction. It is a further object to provide a machine tool chucking system which is convenient, quick of operation, inexpensive, and reliable of manufacture.

The features of the present invention which are believed to be novel are set forth with particularity in the appended claims. The present invention, both as to its organization and manner of operation, and together with further objects and advantages thereof, may be understood best by reference to the following description taken in conjunction with the accompanying drawings.

BRIEF DESCRIPTION OF THE DRAWINGS

FIG. 7 is another preferred embodiment of an electric circuit for controlling the variable speed reversible electric drill driver of FIG. 3.

FIG. 8 is an electrical schematic diagram of a preferred embodiment of a direct current energized electric control system for controlling the variable speed reversible battery of DC operated electric drill driver such as shown in FIG. 3.

FIG. 9 is a schematic electrical diagram of another preferred embodiment of a direct current powered electric control system for control of the reversible variable speed battery or DC operated electric drill driver such as shown in FIG. 3.

FIG. 13 is a schematic drawing showing another preferred embodiment of the chuck sleeve locking system and motor control switching in accordance with this invention.

FIG. 14 schematically shows another means for engaging the chuck sleeve.

FIG. 15 is a schematic drawing of another preferred embodiment of chuck sleeve engagement structure and motor control switching.

FIG. 16 is a schematic drawing of another embodiment of chuck sleeve engaging structure and motor control switching.

FIG. 17 is a schematic drawing of another preferred embodiment of chuck sleeve engaging structure and motor control switching.

FIG. 18 is a schematic drawing showing chuck sleeve engaging structure with a mechanical interlock and motor control switching.

FIG. 19 is another preferred embodiment of chuck sleeve engaging structure, and motor control switching shown in the engaged position.

FIG. 20 is the same as FIG. 19 and showing the structure in the to-be-engaged position.

DESCRIPTION OF THE PREFERRED EMBODIMENTS

Figure 1:
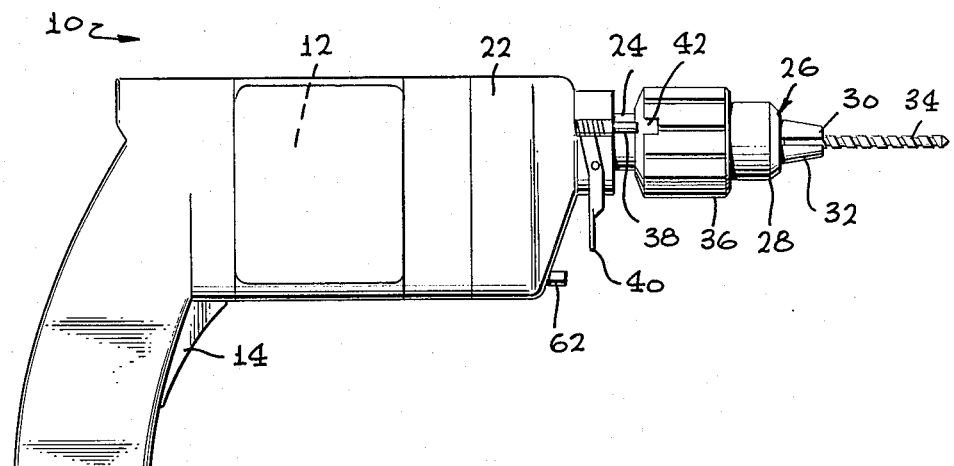
FIG. 1 is a side-elevational view of a single speed, one directional electric drill driver equipped with the chucking system of this invention.

The chucking system of this invention can be used on any machine tool where chucks are used to hold tools of various sorts. A typical machine tool of this nature is generally indicated at 10 in FIG. 1. In this case, it is a single-speed unidirectional electric drill driver. Drill driver 10 is an electric motor driven device with the electric motor 12 being positioned in the large or central section of the drill driver. Trigger 14 controls switch 16 (see FIG. 2) to power the motor which has armature 18 and field 20. Armature 18 is usually connected through a gear reduction in gear housing 22 to drive spindle 24 on which chuck 26 is mounted.

Chuck 26 is a keyless chuck, later described in greater detail. It is body 28 in which a plurality of jaws (usually three jaws, of which jaws 30 and 32 are shown) is mounted. The jaws are shaped with respect to the interior of body 28 so that, when the jaws are forced forward (to the right in FIG. 1), they converge and can clamp, on a tool for example, on drill 34. Body 28 is mounted on spindle 24 so that, when the spindle rotates, the drill 34 is rotated. Sleeve 36 is rotatably mounted on body 28 and engages the jaws so that by rotation of the sleeve with respect to the body, the jaws are forced forward or back for respective clamping of the jaws on the drill. It is to the forceful control of sleeve 36 with respect to the body 28 to which this invention is directed.

Figure 2:
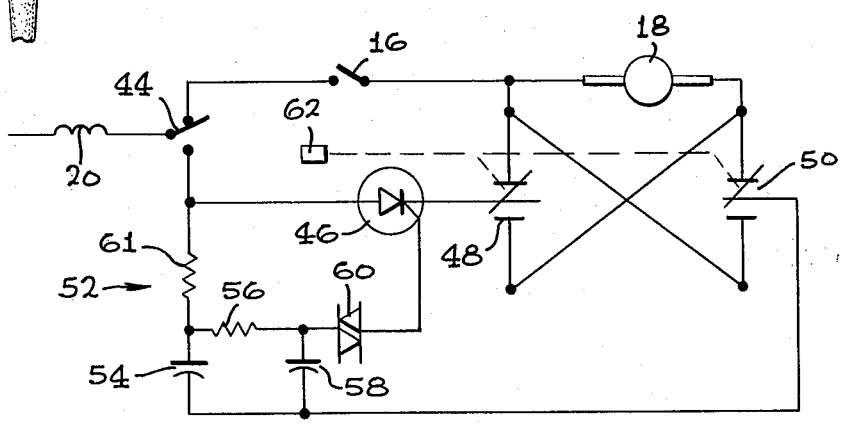
FIG. 2 is a schematic electrical diagram of the electrical control of the electric drill driver of FIG. 1.

Pin 38 is mounted on and can be thrust forward by motion of actuator 40 which is mounted on the frame of drill driver 10. A spring normally holds the actuator and pin in the inactive position shown. Slot 42 is formed in the back of sleeve 36 and can receive pin 38. Thus, upon motion of actuator 40, sleeve 36 can be locked to the frame of drill driver 10. If the power is then turned on, spindle 24 rotates the chuck in the tightening direction. However, normal motor speed and torque is too great for the proper tightening of the chuck. A lesser speed and torque is required. For this reason, the motor control circuit of FIG. 2 is provided. Actuator 40, in addition to advancing pin 38 also moves double throw switch 44 to the lower position, which is the slow speed position. In this position, SCR 46 is connected in series with field 20 and in series with armature 18 through reversing switches 48 and 50.

SCR 46 may be a thyristor or triac. The SCR control circuit 52 is conventional and comprises capacitor 54 of about 0.1 microfarad, resistor 56 of about 2,000 ohms, and capacitor 58 of about 0.01 microfarad. These elements trigger diac 60 which, in turn, triggers SCR 46 for driving the motor. The time that the SCR is conducting is dependent on the charging time of the capacitors which is controlled by resistor 61 which can be made variable, but is about 250 kilo-ohm. Motors of different sizes will require circuit elements of slightly different values. As an alternative, elements 56 and 58 can be omitted, and the circuit is still operative but not with as good control. Alternatively, integrated circuit controllers such as RCA Model CA3058, CA3059 and CA379 as furnished by RCA Solid State Division, Somerville, NJ. can be employed.

With this circuit, when actuator 44 is operated, sleeve 36 is coupled to the frame of drill driver 10 by means of pin 38, and at the same time, switch 44 turns on motor 12 at low speed in the forward direction. This motor torque tightens chuck 26 so that the jaws firmly grasp the drill. Thereafter, actuator 40 is released, and the drill driver 10 is used in the conventional manner. When it is desired that drill 34 be removed, it is necessary to loosen chuck 36. Button 62 is connected to control the reversing switches 48 and 50. To release the chuck, actuator 40 and the button 62 are operated so that the motor runs at low speed in the reverse direction. This holds sleeve 36 while the spindle and chuck body rotate in the reverse direction to release the chuck jaws. Thus, with actuator 40 operated, the chuck will be opened or closed depending on the direction of motor drive, and the reverse or forward direction is controlled by switch button 62.

Figure 3:
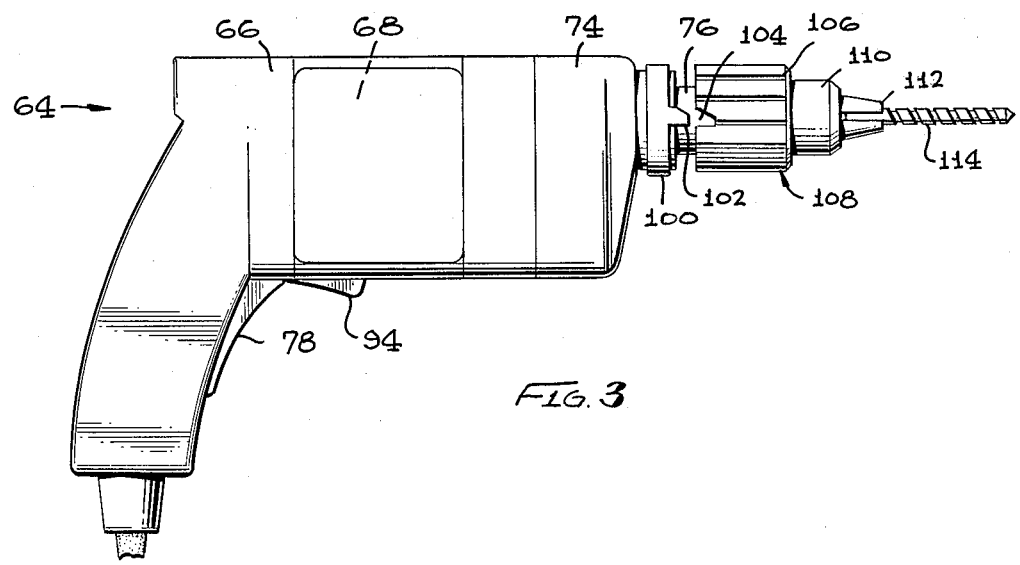
FIG. 3 is a side-elevational view of a reversible variable speed electric drill driver incorporating the chucking system of this invention.
Figure 4:
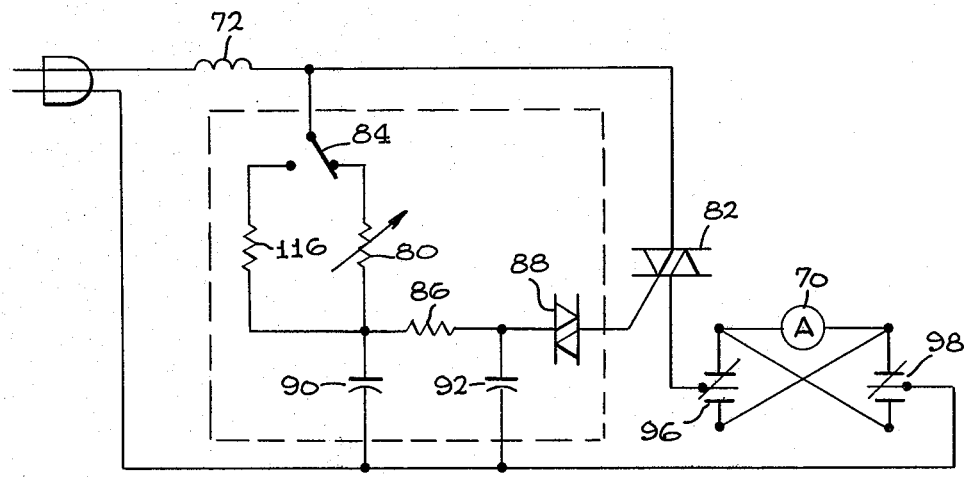
FIG. 4 is an electrical schematic diagram of the first preferred circuit for use with the reversible variable speed electric drill driver of FIG. 3.

Another modern drill driver is the reversible variable speed drill driver 64 illustrated in FIG. 3. It has a frame 66 in which is located motor 68 which is comprised of armature 70 (see FIG. 4) and field 72. As in the previously described drill driver, drill driver 64 has a gear reduction in gear housing 74 so that the motor drives output spindle 76. Trigger 78 controls speed control variable resistor 80. As is seen in FIG. 4, field 72 and armature 70 are connected in series with triac 82 so that the energization of the triac controls the motor speed. With switch 84 in the position shown in FIG. 4, control for triac 82 is connected through variable resistor 80, resistor 86 and diac 88. Capacitors 90 and 92 are connected around resistor 86. These elements correspond to the resistors 62 and 56 and capacitors 54 and 58 connected to diac 60 in FIG. 2. Thus, operation of variable resistor 80 by trigger 78 controls the speed of motor 68 during use of the drill driver 64. Trigger 94 is connected to reversing switches 96 and 98 so that spindle 76 can operate in either the forward or reverse direction.

Actuator 100, see FIG. 3, is arranged to slide in the direction of the spindle axis without rotating around the axis. This can be accomplished by one or more axial keys or a spline structure. Actuator 100 carries pain 102 formed thereon for engagement in slot 104 in sleeve 106 of chuck 106. As described with respect to chuck 26, chuck 108 has body 110 mounted to rotate with spindle 76 and jaws 112 in the body to tighten a tool such as drill 114 in the chuck. For tightening, actuator 100 is slid forward with its pin 102 engaging in slot 104. The same motion causes switch 84 to swing to the left, placing resistor 116 in the motor speed control circuit instead of variable resistor 80. Resistor 116 is sized to provide the desired motor speed and torque for proper tightening of chuck 108. Pin 102 and slot 104 are beveled on the side that engages during tightening to limit tightening torque. If too much torque is applied by the motor due to some other problem, then tightening torque is limited. The pin 102 is forced out of engagement when the torque reaches a certain value.

In loosening the chuck, reversing trigger 94 is actuated to reverse switches 96 and 98. Thereupon, with sliding forward of actuator 100, the motor is operating in the chuck-opening direction for opening the chuck and releasing drill 114.

Figure 5:
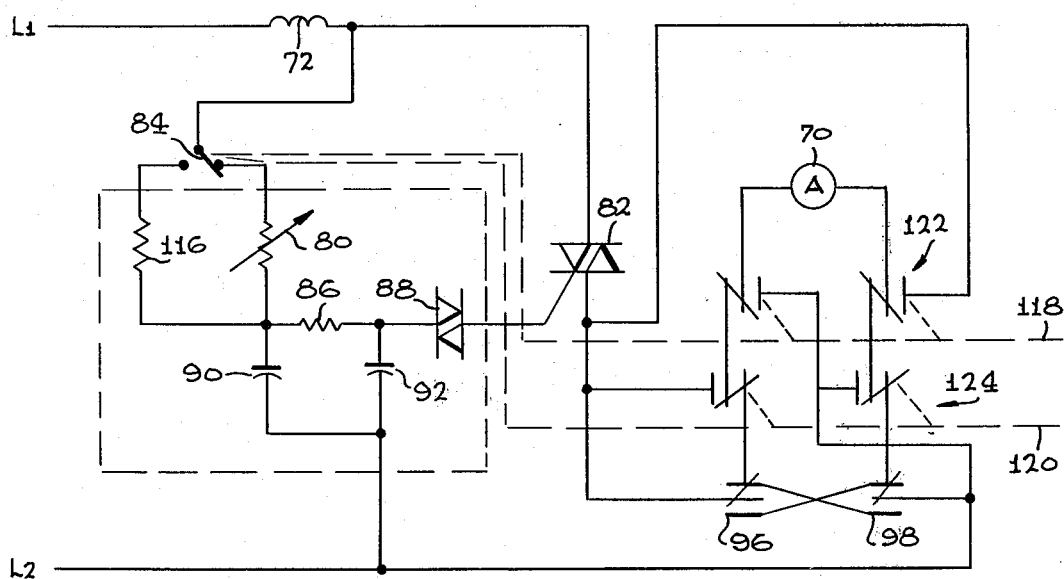
FIG. 5 is an electrical schematic diagram of another preferred embodiment of circuit for the control of a variable speed reversible electric drill driver, as shown in FIG. 3.

FIG. 5 illustrates a circuit wherein a dual actuator is employed on drill motor 64 so that a first actuator is provided and marked to open a chuck and a second actuator is provided and marked to close a chuck. In this case, the circuit for such an arrangement is shown in FIG. 5. The circuit of FIG. 5 controls the motor direction for opening or closing the chuck by control of the first or second actuator irrespective of the setting of the standard reversing switches 96 and 98, as controlled by reversing switch trigger 94. The first and second actuators are respectively connected to links 118 and 120 which are respectively connected to reversing switch sets 122 and 124 and are both connected to individually operate switch 84. Reversing switch sets 122 and 124 are connected to the line and to the armature and to the reversing switches 96 and 98 so that, when either of the links 118 and 120 are actuated, the reversing switches 96 and 98 are disconnected. When first link 118 is actuated by the first actuator for closing of the chuck, the reversing switch set 122 is actuated as well as switch 84 so that the spindle 76 is driven forward with the correct torque for tightening of the chuck. In the case of opening the chuck, second actuator link 120 is operated to operate reversing switch set 124 for reverse operation of the motor and for slowspeed operation by moving switch 84 to the left. In either case, the predetermined direction from the setting of normal reversing switches 96 and 98 and predetermined speed by setting of resistor 80 are overcome.

Figure 6:
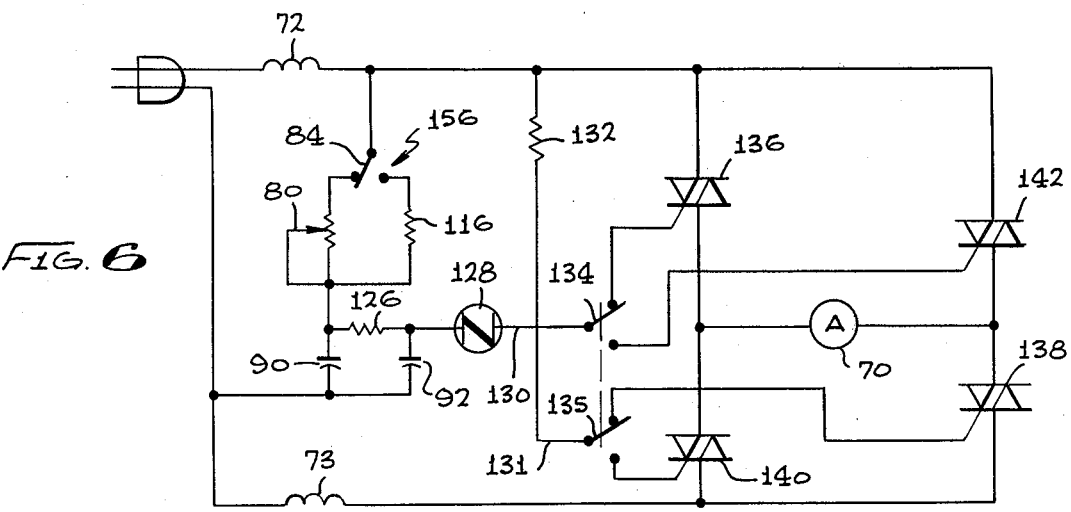
FIG. 6 is an electrical schematic diagram of another preferred embodiment of a circuit for controlling the reversible variable speed electrical drill driver of FIG. 3.

The reversing switches in the circuits of FIGS. 2, 4 and 5 carry a full motor current load. FIG. 6 is a schematic drawing of an improved system that replaces the complex double-pole, double-throw motor reversing switches of FIGS. 2, 4 and 5. In the circuit of FIG. 6, only the gating current of the motor current supply triacs are carried by mechanical switches, and triacs themselves are controlled to provide the reversing function. In FIG. 6, the same variable speed-reversing electric drill driver 64 is employed with its motor armature 70 and field 72. Furthermore, switch 84 selects between normal operation in the position shown and the chuck operating status in the other position. The circuit of FIG. 6 combines the important functions of solid-state switching along with motor reversing, speed control and low-current switching for the motor reversing selector switch. Normally, the conventional reversing switch, as shown in FIGS. 2, 4 and 5, will carry the full motor current, while in the circuit of FIG. 6, the switch carries only the triac gating current which is usually less than 1 percent of the armature current. In the circuit of FIG. 6, variable resistor 80 and speed control resistor 116 are selected by switch 84 for normal variable speed control or chuck tightening and untightening torque, respectively. Capacitors 90 and 92 are provided, but, in the present case, resistor 126 is of a relatively higher impedance (for example, 56 kilo-ohms) in order to isolate the gate current of the triac from any power feedback between the control circuit and the armature current. The speed control circuit supplies diac 128 which feeds control line 130. In addition, control line 131 is fed by resistor 132 to a gate potential sufficient to cause triac conduction.

Switches 134 and 135 are operated by reverse control trigger 94. Control line 131 has sufficient bias to cause triac 138 to be conductive, and triac 136 is controlled by line 130 which is fed by the speed control circuits for forward rotation in the position indicated. With the reversing switches 134 and 135 in the raised position shown, the motor current is through triac 138, leftward through armature 70, through triac 136, and thence through field 72. When the reversing switches 134 and 15 are in the lower position, triac 140 is made conductive by bias from control line 131 and triac 142 is controlled by the speed control circuitline 130 to control the motor speed in the opposite direction. In this configuration, current passes through triac 140, rightward through armature 70, through triac 142, and thence through field 72 for reverse motor direction. When the actuator locks the chuck sleeve, then switch 84 is moved to the right position where resistor 116 controls the speed control to provide the proper motor torque for proper chuck opening and closing.

Depending on motor configuration, it may have a divided field, with half the field connected in the other side of the circuit as illustrated at 73 in FIG. 6. Furthermore, this circuit is shown as applied to a series motor, with both field and armature current being controlled. However, it is clear that it is also applicable to field control without armature control. Furthermore, the circuits of FIGS. 4, 5 and 6 are shown with triacs as the prime current control device. However, field effect transistors and back-to-back SCRs could alternatively be used in such a system. Furthermore, in direct current systems transistors could be employed as the main current control device. In the circuit of FIG. 6, phase control could be applied to all of the triacs rather than just the triacs 136 and 142. However, such is unnecessary, and the preferred embodiment of FIG. 6 shows the triacs 138 and 140 selectively turned on by control line 131. This, in effect, turns on the selected triac anytime the circuit is energized and the direction selected. In the present circuit, the resistor 132 would be about 10 kilo-ohms to provide the bias supply and provide isolation. Without considering the feedback problem, 1 kilo-ohm for resistor 132 would be adequate, depending on the particular triac gate firing current. However, higher value is preferably provided for isolation from feedback currents. Furthermore, in FIG. 6, resistor 126 would be between 2 and 100 kilo-ohms, depending upon the sensitivity of the gate being driven.

As previously discussed with respect to FIG. 3, switch 84 is controlled by actuator 100 and reversing switches 134 and 135 can either be controlled by reverse selector trigger 94 or else by selectively actuated torque collars for chuck-closing or -opening.

FIG. 7 is a schematic electrical drawing of another preferred circuit for the control of the drill driver 64 of FIG. 3 which represents the driver for the chucking system of this invention. Motor armature 70 and field 72 are shown as connected in series through pairs of triacs. When triacs 144 and 146 are energized, the current path first goes through the field 72, through triac 144 and rightward through armature 70 and thence through triac 146 to the return. However, with triacs 144 and 146 deenergized and triacs 148 and 150 energized, the current path goes first through field 72, then triac 150 and leftward through armature 70 and thence through energized triac 148 to the return. Switch 152 is the direction selector switch which selects the rotative direction of the spindle. As previously described, direction selector switch 152 can either be manually actuated (depending on whether tightening or loosening of the torque is desired) or can be selected by operating one of the separate actuators provided for tightening or loosening. As previously described, switch 84 is preferably operated by the actuator to select the desired torque for chuck closing or opening, as compared to other speed selection. Control circuit 154 is the same as control circuit 156 in FIG. 6 and is similar to the corresponding control circuit in FIGS. 4 and 5.

The principal difference between the circuits of FIGS. 6 and 7 is the actuation supplied to the triacs. Control line 156 is supplied from speed control circuit 154 when the switch is in the upper position. Circuit 154 is a phase control circuit which controls the point on the phase when triac 144 is turned on to thus control the current through armature 70 and field 72. Diode 158 rectifies the gate current to triac 146, and this gage current is stored in capacitor 158. This causes triac 146 to conduct through the full wave of the motor current. Resistor 160 limits the current to capacitor 158 to stabilize the gate potential on triac 146. In this way, the motor speed is controlled by the phase angle of turn-on of triac 144 with triac 146 serving as a switch for the return current. Once reversing switch 152 is in its lower position, the corresponding gate control lines and elements for triacs 148 and 150 perform a similar function.

Depending on the components used and their current drain, if more current is needed for the maintenance of the charge on capacitors 158 and 162 when they are alternatively charged, the diac 164 could be replaced by one diac in the control lines 156 and another diac in the corresponding lower control line 164. This would allow the capacitors to get their charge directly from the phase shift speed control network 154. Furthermore, by adding another pole to switch 152, a separate DC gate supply could be separately and directly provided for triacs 146 and 150.

FIG. 8 is a schematic electric circuit diagram of a circuit suitable for the control of the machine tool, such as the electric drill driver 64 of FIG. 3, in the case where the power supply is direct current. DC source 164 is serially-connected through field coil 166, transistor 168, reversing switch 170, armature 172, and reversing switch 174. Reversing switches 170 and 174 are controlled by a suitable manual direction control lever, such as direction control trigger 94. On the other hand, it can be operated by a pair of actuators in the case where separate actuators are provided for opening and closing of the chuck. The control system of FIG. 8 shows a preferred circuit for controling the motor speed, either in response to demands by the machine tool operator when the tool is in place for normal work or at a slow speed for the opening and closing of the chuck. Selector switch 176 in its upper position places the bridge formed by potentiometer 178 across control lines 180 and 182 when in the upper position and the bridge formed by resistors 184 and 186 across those control lines when the switch is in the lower position. The control circuit is one where the full DC voltage is switched onto the motor by controlling the switching of transistor 168 at a variable frequency depending on the motor speed desired. With this method, greater motor torque can be achieved at the lower motor speeds because of the constant amplitude voltage pulses to the motor. The pulses should be long enough to allow the motor current to increase to a substantial value, but spaced far enough apart so that the motor cannot achieve a speed above that desired for operation of the chuck.

This timing is accomplished by integrated circuit unit 188. An example of an integrated circuit unit 188 suitable for this purpose is part No. LM555, as manufactured by National Semiconductor, of Santa Clara, Calif. 95051. The numbers shown in the rectangle indicating integrated circuit unit 188 are the terminal numbers of that particular unit. In the example shown, capacitor 190 is about 2.2 microfarads. Transistor 168 acts as a DC switch in the serial connection of the field, reversing switches and armature. The transistor 168 is controlled by the output terminal 3 of integrated circuit unit 188 with the base current limited by resistor 192. Diodes 194 and 196 are arc suppressors for the inductive motor load.

In normal operation, switch 176 is in the raised position shown and the potentiometer wiper 198 is in the upper, dotted line position. As the trigger 78 is pulled, the potentiometer wiper moves downward. The change in resistance seen by the integrated circuit unit 188 as the potentiometer wiper 198 goes downward increases the on-time of the system, thereby increasing the speed and the power of the motor.

To open or close the chuck, the switch 176 is moved to the lower position. In is operated by the actuator 100 that also engages and locks the chuck. The lower position of switch 176 provides the battery voltage in accordance with the bridge formed by resistors 184 and 186 to cause control unit 188 to operate at a frequency and pulse length that will drive the motor at the desired high torque and relatively slow speed. As previously described, the setting of reversing switches 170 and 174 controls the motor direction, thereby causing opening or closing of the chuck. In the specific example discussed, potentiometer 178 is approximately 1 megohm, and resistors 186 and 188 are each about 300 kilo-ohms. These component values are for a 117 volt system with the motor being pulsed at a frequency of about 30 hertz for the low-speed, chuck-operating mode. Of course, with the switch 176 in the upper position shown, the on-time of power of the motor can be raised from 0 to 100 percent.

FIG. 9 is a schematic electric circuit diagram similar to FIG. 8, but showing the speed control switching transistor being multiplied and used also for the function of reversing. Thus, the circuit provides solid-state reversing to avoid the mechanical switch reversing and resultant arcing as happens in the circuitry of FIG. 8. The circuit of FIG. 9 is very much like the circuit of FIG. 8, and the similar parts are numbered the same way. Reversing switch 200 connects the signal line 202 to the bases of both transistors 204 and 206 when the switch is in the raised position so that the motor runs in the forward direction. When switch 200 is in the lower position, the control line 200 is connected to the bases of transistors 208 and 210 so that they control the current through the field and armature. In the upper position of switch 200, the motor rotates in the forward, chuck-closing position with the current flowing left-to-right through armature 72. To reverse the motor and open the chuck, switch 200 is moved to the lower position so that the control line 202 is connected to control transistors 208 and 210 so that current flows through armature 172 in the right-to-left direction for reversal of the motor and chuck-opening operation. The resistors connected into the transistor base circuits are for current-limiting and bias, and the choice of their value is a well-known procedure and will depend on the transistors used. Solid-state switches such as field-effect transistors can alternatively be used in this circuit.

Figure 11:
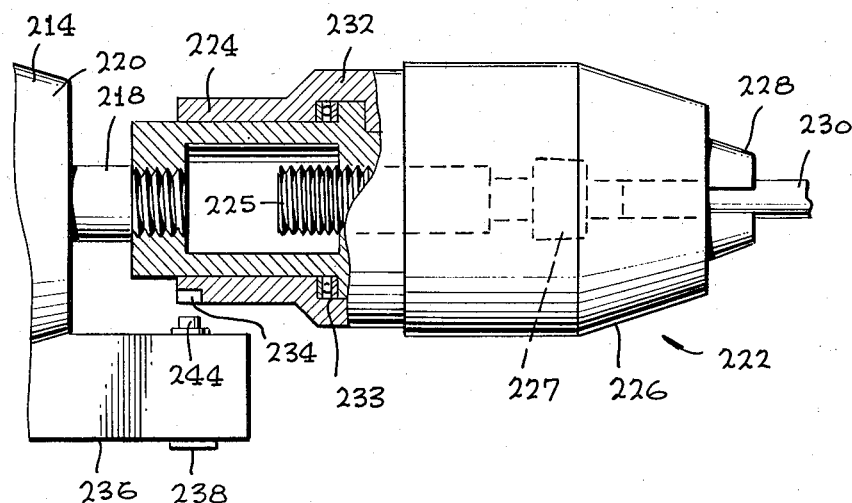
FIG. 11 is a side-elevational view, with part broken away and parts taken in section, of a chuck, its driving spindle and its locking structure in accordance with the chucking system of this invention.
Figure 12:
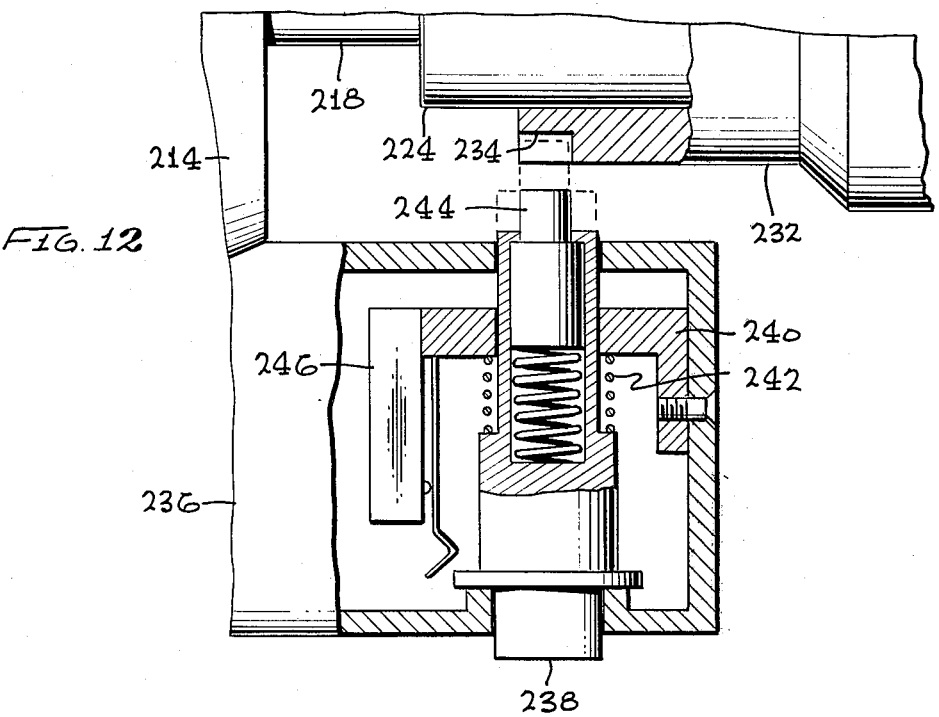
FIG. 12 is an enlarged section taken through the locking plunger of a preferred embodiment of the chucking system of this invention.
Figure 10:
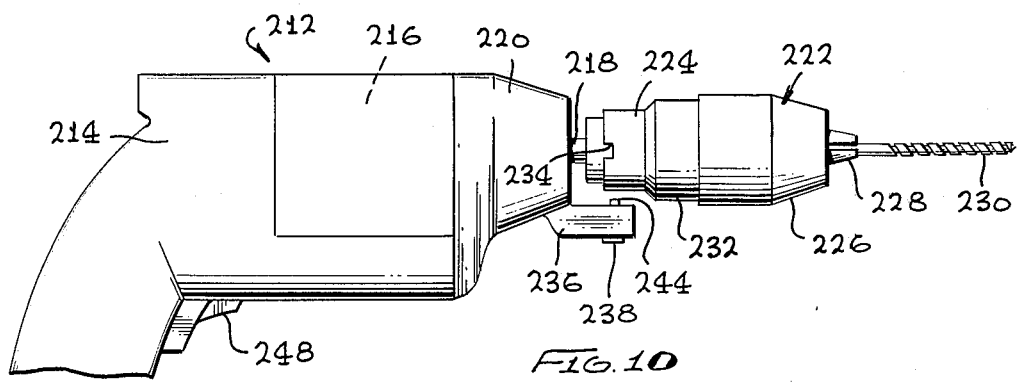
FIG. 10 is a side-elevational view of an electric drill driver incorporating a preferred embodiment of the chucking system of this invention.

Devices 40 and 100 have been named "actuators" because the actuators not only energize the motor, but mechanically lock the sleeve of the chuck with respect to the frame. As indicated in FIG. 1, the actuator can take the appearance of a lever switch. In FIG. 3, it is shown as a sliding sleeve. It can be a toggle-type structure or a pushbutton, as shown in one of the preferred embodiments illustrated in FIGS. 10, 11 and 12. The machine tool illustrated in FIG. 10 is an electric drill driver generally indicated at 212. Electric drill drive 112 is similar to drill driver 64 and has frame 214 which contains motor 216 which drives spindle 218 usually through a gear box 220 mounted in the frame 214. As seen in FIGS. 10, 11 and 12, chuck 222 is mounted on spindle 218. Chuck 222 has body 224 which is threaded onto spindle 218 and rotates therewith. Collar 232 rotates on body 224, and anti-friction bearing 233 is often used for ease of rotation in better quality chucks. Collet collar 226 is threaded onto sleeve 232 and rotates therewith. It carries therein jaws 228. The interior of collet 226 and the exterior of jaws 228 are matching tapers about the axis of rotation of spindle 218. There are usually three jaws 228. Driver 225 has head 227 which engages against the jaws 228. Fingers on the jaws extend to engage underneath head 227. Driver 225 and jaws 228 rotate with sleeve 232. As is shown in FIG. 11, driver 225 is threaded into body 224 so that, when the collet 232 and collet collar 226 are rotated with respect to the body, driver 225 moves its head 227 axially inside of collet collar 226 by action of the screwthreads on driver 225 engaging in companion screwthreads in body 224. Head 227 moves to the right to thrust the jaws outward to the right in the collet collar to this close the jaws around a tool such as drill 230. When the rotation of sleeve 232 is opposite, the driver 225 moves to the left and its head withdraws the jaws into a larger portion of the taper in the collet collar to open the chuck, releasing the tool. Sleeve 232 carries slots 234 by which it can be engaged.

Frame 214 has formed thereon forwardly extending arm 236 in which is mounted actuator pushbutton 238. As seen in FIG. 12, pushbutton 238 slides through glide 240 and spring 242 therebetween urges the pushbutton to the retracted position shown in FIG. 12. Pin 244 is forwardly spring-loaded in pushbutton 238 and is aligned with slot 234. As the pushbutton is thrust inward, pin enters slot 234 except when the slot is not directly aligned therewith. In that case, pin 244 compresses into pushbutton 238 until sleeve 232 is rotated to a point where the pin is urged by its spring into the slot. Switch 246 is actuated by a collar on the actuator pushbutton so, when the pushbutton is depressed, switch 246 is actuated. Switch 246 is the switch 44 of FIG. 2, the switch 84 of FIGS. 4, 5, 6 and 7, and the switch 176 of FIGS. 8 and 9. Thus, when the switch 246 is actuated, spindle 218 is rotated at the slow, chuck-operating speed either in a forward or reverse direction as a separate switch determines. With pushbutton 238 depressed, sleeve 232 is locked to frame 214 and the spindle 218 rotates. This causes relative rotation of sleeve 232 with respect to chuck body 224 to open or close the chuck, depending upon direction. Trigger 248 (see FIG. 10) can be a direction selector trigger. In order to close the chuck, the forward direction is chosen and the pushbutton 238 is pressed so that the spindle 218 runs in the forward direction while sleeve 232 is held to close the chuck. To open the chuck, it is only necessary to reverse the direction and operate pushbutton 238.

FIGS. 13 through 20 schematically show various structures which can interact between the frame and the chuck sleeve to serve as an actuator. In these Figures, chuck 250 has a slot 252 in its chuck sleeve 254. In FIG. 13, actuator pushbutton 256 (when pressed against its spring 258) permits actuator pin 260 to be resiliently urged forward under the force of its spring 262. Furthermore, pressing actuator pushbutton 256 operates switch 264, which is the switch which places the motor in show speed, chuck-operating mode. It is the switch 44 of FIG. 2, the switch 84 of FIGS. 4, 5, 6 and 7, and the switch 176 of FIGS. 8 and 9. Since actuator pin 260 is spring-urged, it drops into slot 252 whenever alignment occurs. When pushbutton 256 is released, spring 258 returns the pushbutton and overcomes the force of pin spring 262 to withdraw the actuator pin.

FIG. 14 illustrates that chuck 250 can have a projection 266 on its chuck sleeve instead of the slot 252. Projection 266 cooperates with the actuator pin 268 the same way that the various slots, including slot 252 cooperate with the corresponding actuator pins.

In FIG. 15, actuator pushbutton 270 operates switch 264 and permits pivoted actuator pin 272 to swing forward under the force of its spring to engage in slot 252.

In FIG. 16, actuator pushbutton 274 acts as both an operator for pressing in actuator pin 276 and as a switch contact 278 which switches resistor 280 into the circuit. Resistor 280 is the chuck-operating speed control resistor 116 of FIGS. 4 through 7. The variable speed control resistor is not disconnected from the circuit with this switching operation, but, instead it is presumed that the variable speed potentiometer is on 0 speed, by being unactuated, during chuck-opening and -closing operations.

FIG. 17 shows an actuator structure with two actuator pins. Actuator lever 282 is pivoted so that its pin 284 can swing into engagement with slot 252 when they are aligned. Actuator pushbutton 286 thrusts the actuator lever and its pin forward. Pushbutton 286 also actuates switch 288 which controls the control circuit 290 to cause the motor to rotate in the forward, chuck-closing direction with the proper speed of torque for proper chuck closing. On the other hand, actuator lever 290 carries actuator pin 292 which can be thrust forward for engagement in slot 252 when the slot is properly aligned. Actuator pushbutton 294 controls actuator lever 290 and urges it forward, and, in addition, controls switch 296 which is connected to the control system through its connecting switch lines to operate the motor in the reverse, chuck-opening direction at a proper speed and torque. There are two advantages to the separate pushbuttons for forward and reverse operation. One is that the actuation of a pushbutton causes directional rotation depending on whether the chuck-opening pushbutton or the chuck-closing pushbutton is depressed, as well as the control of the motor speed and torque to the proper level. This raises a third advantage where the opening torque can be somewhat higher than the closing torque so that the chuck would not be locked closed without the ability to reopen it. Thus, by using separate pushbuttons for opposite directions, separate speeds and/or torques can be selected in the two directions.

FIG. 18 shows a two-actuator pushbutton structure with actuator pushbuttons 298 and 300 which are spring-urged outwardly by respective compression of springs 302 and 304 and which respectively operate switches 306 and 308 when the pushbuttons are depressed. The switches are arranged so that, when one of the actuator pushbuttons is depressed, then the switch contacts are connected into the control circuit in such a manner that the chuck 250 rotates in the tightening direction and, when the other actuator pushbutton is depressed, the chuck 250 rotates in the chuck-opening direction. Actuator pin 310 is urged by compression spring 312 in a direction to engage in slot 252 when they are in alignment. Thus, pressing either actuator pushbutton causes the motor to operate at the chuck-opening or -closing speed and permits the actuator pin to be spring-thrust forward into slot 252 when the slot is in alignment with the actuator. The direction of rotation of the spindle, for chuck-closing or chuck-opening depends on which of the actuator pushbuttons 298 or 300 is selectively depressed. As in the circuitry of FIG. 17, the chuck-opening torque can be arranged to be higher than the chuck-closing torque.

FIGS. 19 and 20 show an actuator embodiment particularly useful in chuck-opening. The embodiment of FIGS. 19 and 20 is particularly a species of the more generic embodiment shown in FIGS. 10, 11 and 12. FIGS. 19 and 20 are taken transversely to the spindle axis. Chuck 250 has its slot 252 in its sleeve 254. In the opening direction, the chuck and spindle move in the clockwise direction as viewed from the chuck jaws to the spindle, which is the view direction in these figures.

Actuator pin 314 is positioned within actuator pushbutton 316 and is resiliently urged forward by compression spring 318. When the pushbuttom actuator 316 is thrust forward in the frame 322 of the machine tool such as electric drill driver 212, it is thrust forward against the force of compression spring 320. Furthermore, in the actuator engagement direction thrust collar 324 operates switch 326. Switch 326 switches out variable speed motor control and switches in reduced speed motor control for chuck-opening. Thus, switch 326 is the switch 84 in FIGS. 4 through 7 and switch 176 in FIGS. 8 and 9. Furthermore, guide 328, which is a web in the frame, has larger guide opening therethrough than is necessary for pure guidance of actuator pushbutton 316. There is a gap between the pushbutton actuator and the edge of the opening in web, and compression spring 330 urges pushbutton actuator toward the bottom of the opening to present the gap at the top, as is shown in FIG. 20. When the pushbutton actuator 316 is pressed in, the motor is rotated in chuck-opening direction at slow speed, and if the actuator pin 314 is not then aligned with slot 252, the chuck sleeve 254 makes a whole turn. During this operation, the pushbutton actuator is down leaving a gap between it and the frame toward the top. Actuator pin 314 is pressed back into actuator pushbutton 316, as shown in FIG. 20, until slot 252 lines up with actuator pin 314. At that time, actuator pin is spring-thrust forward into engagement in the notch and is able to move fully into the notch, as is shown in FIG. 19. However, continued rotation of the chuck sleeve 254 moves pushbutton actuator 316 upward in its oversized guide slot in guide web 328 to compress spring 330 and finally sharply come to rest at the top of the guide slot opening, as is shown in FIG. 19. With this structure, a sharp rap is provided to the chuck sleeve 254 in the opening direction so that chuck-opening is aided. Sometimes a sharp rap of that nature is helpful in overcoming the initial friction of the parts which were tightly clamped together by chucking action. Thus, chuck-opening is assured. If desired, this "hammering" can be repeated. When pushbutton actuator 316 is released, compression spring 330 moves toward the lower part of the guide opening and guide web 328 so that, the next time the pushbutton actuator 316 is pressed, actuator pin 314 does not directly enter slot 252 but engages next to it, as is shown in FIG. 20, so that the spindle can make a full revolution increasing speed until actuator pin 314 is again thrust into slot 252 for another such hammering actuation.

This invention has been described in its presently contemplated best mode, and it is clear that it is susceptible to numerous modifications, modes and embodiments, within the ability of those skilled in the art and without the exercise of the inventive faculty. Accordingly, the scope of this invention is defined by the scope of the following claims.

What is claimed is:

1. A control system for controlling the direction and speed of a motor which drives a chuck for the selective opening and closing of the chuck, said control system comprising:

means for varying the current fed to the electric motor by varying the phase chopping of alternating electric current supplied to the motor to control the motor speed, said means including two solid-state electric current switching devices for passing current for driving the motor in a first direction, and two solid-state electric current switching control devices for passing current to the motor for driving the motor in the second direction;

means for controlling the solid-state switching devices for controlling the motor speed to a preselected lower speed than maximum speed and for selectively controlling the speed of rotation by controlling the duration of conductivity of the solid-state switching devices; and means for locking a portion of the chuck with respect to the motor frame in order to open or close the chuck in accordance with the selected motor rotation direction.

2. The control system of claim 1, wherein said solid-state switching devices are triacs.

3. A chucking system comprising:

a frame, a motor connected to said frame for rotating a spindle with respect to said frame;

a chuck having a body mounted on said spindle for rotation with said spindle;

a sleeve on said chuck for rotation on said chuck with respect to said chuck body for selectively opening or closing said chuck in accordance with the selected direction of rotation;

actuating means for both interengaging between said frame and said sleeve and for energizing the motor for rotation in a direction and at a speed for selected chuck-opening and -closing; and means connected to said motor for selectively controlling the speed thereof between a maximum motor speed and a lower chuck-opening and -closing speed.

4. A chucking system comprising
   a chuck having first and second elements;
   means for holding said first element of said chuck;
   means for driving said second element of said chuck at a controlled high and low speed and in the selected direction while said first element of said chuck is being held, said means for driving said second element of said chuck including means for disconnecting a high-speed drive of said element of said chuck while said first element of said chuck is being held so that said means for driving said second element of said chuck selectively applies low-speed rotation and torque for the tightening and loosening of said chuck.

5. A chucking system comprising:
   a tool having a frame and a spindle rotatably mounted in said frame, a motor for rotating said spindle with respect to said frame;
   a chuck having a chuck body mounted on said spindle and having a chuck sleeve rotatably mounted on said body for opening and closing said chuck by rotation of said sleeve in a selected first or second direction;
   a first switch connected to control said motor to rotate said spindle at a reduced speed in a forward direction for closing said chuck;

a second switch connected to control said motor to open said chuck by driving said motor to rotate the spindle at a reduced speed in the reverse direction;

an actuator element movable into engagement with said sleeve for engaging said sleeve when one of said switches is operated so that said element can engage and lock said sleeve of said chuck so that said chuck is opened or closed depending upon which of said first and second switches is operated; and means interlocking said movable element and said switches so that said movable actuator element is restrained from engagement with said chuck sleeve unless one of said first or second switches is operated.

6. A system comprising
a chuck having a body member and a sleeve member;
a machine tool having a motor and rotatable spindle, one of said chuck members being connected to be driven by said spindle;
means for holding said other member of said chuck so that said motor will rotate said chuck members with respect to each other, jaws in said chuck connected to said sleeve member and said body member so that relative rotation between said members selectively opens or closes said jaws; and
motor control means for controlling the direction of rotation and speed of rotation of said spindle, said spindle speed and direction control means being actuated when said chuck member holding means is actuated to rotate said motor at a speed less than maximum motor speed.

7. A chucking system comprising:
a machine having a frame and having a spindle rotatably mounted in said frame, a motor connected to said spindle for selectively rotating said spindle in a first direction or a second direction:
a chuck having a chuck body mounted on said spindle, said chuck having a sleeve rotatably mounted with respect to said chuck body and arranged so that, when said spindle drives said chuck body in said first direction and said sleeve is held, said chuck closes, and, when said spindle rotates said body in said second direction while said sleeve is held, said chuck opens;
an actuator movably mounted with respect to said frame for engaging said chuck sleeve so that, when said actuator is engaged with said chuck sleeve and said spindle is rotated in said first direction, said chuck is closed and, when said actuator is engaged with said chuck sleeve and said spindle is rotated in said second direction, said chuck is opened; and
an electric motor speed control system, said electric motor speed control system controlling the speed of the motor so that, when said actuator is engaged with said sleeve, said motor rotates at a speed less than maximum motor speed.

8. The chucking system of claim 7 wherein said actuator is connected to control said motor control circuit so that, when said actuator engages said chuck sleeve, said motor is controlled in the low speed mode.

9. The control system of claim 7 wherein resilient means engaging against said actuator urges said actuator in the first direction of said sleeve so that, when said sleeve is rotating in said second direction and said actuator engages said sleeve, said actuator moves with respect to said frame against the resilient force to hammer against said frame to provide a hammerlike blow onto said sleeve in the chuck-opening direction.

10. The chucking system of claim 9 wherein said actuator comprises a pushbutton actuator member movably mounted with respect to said frame and resiliently urged in a disengaging direction, and an actuator pin mounted on said pushbutton actuator with said actuator pin resiliently urged in the engagement direction with respect to said pushbutton actuator, said chuck sleeve having a slot therein to receive said actuator pin.

11. The chucking system of claim 10 wherein said pushbutton actuator has sufficient freedom of motion against its resilient urging in the second direction that, when said pushbutton actuator is actuated and said pin enters said slot on said chuck sleeve, together with rotation in the second direction sufficient to move said pushbutton actuator to the limit of its motion in the second direction within the frame, when said pushbutton actuator is released and again reengaged, said pushbutton actuator is resiliently urged in the first direction, said actuator pin is out-of-line with said slot in said chuck sleeve and, upon motor actuation of said pushbutton actuator said chuck sleeve rotates almost an entire revolution in the second direction before said actuator pin reengages in said slot to again provide a hammerlike blow to said chuck sleeve.

12. The chucking system of claim 11 wherein said actuator is connected to control said motor control circuit so that, when said actuator engages said chuck sleeve, said motor is controlled in the low speed mode.

13. A tool chucking system for a tool having a frame and having a spindle rotatably mounted in said frame, a motor connected to rotate said spindle with respect to said frame; said motor adapted to operate at maximum motor speed and at a lesser speed
a chuck having a body, said body being mounted on said spindle for rotation with said spindle, a chuck sleeve rotatably mounted on said chuck body;
jaws in said chuck for clamping a tool therein, said jaws being opened and closed by relative rotation of said chuck sleeve and said chuck body;
means for holding said chuck sleeve with respect to said frame; and
means for selectively controlling and operating said motor at said lesser speed to drive said chuck body in a first direction while said chuck sleeve is held with respect to said frame to close said chuck and to drive said chuck-motor in a second direction while said chuck sleeve is held with respect to said frame to open said chuck.

14. A chucking system comprising:
a frame, a spindle rotatably mounted on said frame, a motor for rotating said spindle with respect to said frame, a chuck having a body mounted on said spindle and having a sleeve rotatably mounted on said body so that rotation of said sleeve on said body opens and closes said chuck;
a movable actuator member movable from a first position where it is unengaged with said chuck sleeve to a second position where it is engaged with said chuck sleeve, a resilient member urging said movable member from its first position to its second position;

a switch member movable from an unoperated position to an operated position, said switch member being mechanically interconnected with said actuator member to retain said actuator member in its disengaged position when said switch member is in its unoperated position and for releasing said actuator member to permit it to move from its disengaged to its engaged position when said switch member is moved from its unoperated to its operated position;

a control circuit for controlling said spindle drive motor, said switch member having switch contacts in association therewith, said switch contacts being connected to said motor control circuit for operating said motor at less than its maximum speed when said switch member is operated.

15. The chucking system of claim 14 wherein said switch member is mechanically interconnected to said actuator member so that, when said switch member is released, said actuator member is withdrawn from engagement with said chuck sleeve.

16. The chucking system of claim 15 wherein said switch member is a first switch member and there is in addition a second switch member, said second switch member being mechanically interlocked with said actuator member tht, when said second switch member is moved from its unoperated to its operated position, it moves said first switch member from its unoperated to its operated position and said first switch member permits said actuator member to move from its unactuated to its actuated position.

17. The chucking system of claim 16 wherein resilient means is provided for said second switch member to urge said second switch member from its operated to its unoperated position and to also urge said first switch member from its operated to its unoperated position to withdraw said actuator member from engagement with said chuch sleeve.

18. A chucking system comprising:
a frame, a spindle rotatably mounted in said frame, a motor for rotating said spindle with respect to said frame;
a chuck having a body mounted on said spindle for rotation with said spindle, a chuck sleeve mounted for rotation on said chuck body so that rotation in a first direction opens said chuck and in a second direction, closes said chuck;
said spindle drive motor having a separate field and armature;
a motor direction and speed control system comprising a plurality of electric current solid-state switching devices connected to said motor armature and field so that, when a first selected group of solid-state devices is energized, said motor armature runs in a first direction, and, when a second selected group of solid-state devices is energized, said motor armature runs in a second direction, said control system controlling said solid-state devices to control the duration of current conduction on- and off-time of said solid-state devices to control the amount of current so that control of said solid-state devices controls both the speed and direction of rotation of said motor and of said chuck body; and
actuator means interengaging between said frame and said chuck sleeve so that, upon rotation in first direction, said chuck is closed, and, upon rotation in said second direction, said chuck is opened.

19. The chucking system of claim 18 wherein said solid-state devices are silicon-controlled rectifiers.

20. The chucking system of claim 18 wherein said solid-state devices are triacs.

21. The chucking system of claim 18 wherein the power supply for supplying electric power to said motor is a direct current supply and said solid-state devices are transistors.

22. A tool chucking system for a tool having a frame and having a spindle rotatably mounted in said frame, a motor connected to rotate said spindle with respect to said frame;
a chuck having a body, said body being mounted on said spindle for rotation with said spindle, a chuck sleeve rotatably mounted on said chuck body;
jaws in said chuck for clamping a tool therein, said jaws being opened and closed by relative rotation of said chuck sleeve and said chuck body;
means for holding said chuck sleeve with respect to said frame; and
means for selectively controlling said motor to drive said chuck body in a first direction while said chuck sleeve is held with respect to said frame to close said chuck and to drive said motor in a second direction while said chuck sleeve is held with respect to said frame to open said chuck, said means for driving said motor including speed control means to limit the motor speed to an amount less than maximum motor speed when said chuck sleeve is being held.

23. The chucking system of claim 22 wherein said means for driving said motor includes a control circuit to control motor direction.

24. The chucking system of claim 22 wherein said motor drive means includes switches for controlling a control circuit for selecting motor speed or direction and said switches are mechanically interconnected with said means for holding said chuck sleeve so that selected ones of said switches are actuated upon actuation of said means for holding said chuck sleeve.

25. A chucking system comprising:
a chuck having a body member and a sleeve member, said chuck members being movable with respect to each other and having jaws which are opened and closed by relative rotation of said members;
a drive motor connected to said chuck members for relative rotation of said chuck members, including solid-state switching devices in electrical series with said motor and controllable for operating said drive motor at a speed suitable for chuck jaw-opening and -closing, said speed being less than maximum motor speed; and
means for reversing said chuck member drive motor so that said motor can selectively open and close said chuck.

26. The system of claim 25 wherein one of said members is restrained while said motor drives the other of said members.

27. The system of claim 26 wherein said chuck body is mounted on a spindle and said spindle is rotatably mounted in a frame and said motor drives said spindle, and wherein said chuck sleeve is selectively locked to said frame for relative rotation between said chuck members.

28. The system of claim 25 wherein electrical solid-state switching devices are connected to said drive motor for control of the direction of rotation of said drive motor for selective opening and closing of said chuck.

29. The system of claim 25 wherein electrical solid-state switching devices are connected to said drive motor for control of the direction of rotation of said drive motor for selective opening and closing of said chuck.

30. An automatic chucking system comprising:
   a chuck having first and second relatively movable members for causing opening and closing of the chuck upon relative movement of said first and second members;
   a drive motor connected to said chuck members for relative rotation of said chuck members;
   means for holding one of said members;
   control means connected to said drive motor for driving said other member at less than maximum speed in a closing direction for closing said chuck on a tool; and
   control means connected to said drive motor for driving said other member at less than maximum speed in the opposite direction for chuck opening, said means for closing said chuck being operated at a lower speed than said means for opening said chuck.

31. The chucking system of claim 30 wherein said means for driving one member of said chuck with respect to another member of said chuck is an electric motor and a control means is provided for said electric motor to control the motor speed by means of solid-state devices, said control means being for reversing said motor so that said motor selectively both opens and closes said chuck.

32. The chucking system of claim 31 wherein motor reversal is by means of switching solid-state devices.

33. The automatic chucking system of claim 32 wherein said solid-state devices are controlled to operate said motor at less than maximum speed.

* * * * *